(12) United States Patent
Lin et al.

(10) Patent No.: US 8,523,408 B2
(45) Date of Patent: Sep. 3, 2013

(54) DISPLAY APPARATUS

(75) Inventors: Yi-Fan Lin, Hsin-Chu (TW); Shih-Yao Lin, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 22 days.

(21) Appl. No.: 13/450,642

(22) Filed: Apr. 19, 2012

(65) Prior Publication Data

US 2013/0107567 A1    May 2, 2013

(30) Foreign Application Priority Data

Oct. 28, 2011    (TW) .............................. 100139393 A (51) Int. Cl.
*B60Q 3/04*    (2006.01)
(52) U.S. Cl.
USPC ........... 362/362; 362/609; 362/628; 362/633; 362/296.01; 362/97.1

(58) Field of Classification Search
USPC ................... 362/609, 628, 633, 97.1, 296.01, 362/362
See application file for complete search history.

(56) References Cited

U.S. PATENT DOCUMENTS

| | | | |
|---|---|---|---|
| 2002/0093811 A1* | 7/2002 | Chen | 362/31 |
| 2007/0086213 A1* | 4/2007 | Hsieh | 362/633 |
| 2007/0211496 A1* | 9/2007 | Ito | 362/633 |
| 2012/0044714 A1* | 2/2012 | Lee et al. | 362/609 |
| 2013/0063978 A1* | 3/2013 | Gettemy et al. | 362/609 |

FOREIGN PATENT DOCUMENTS

CN    102121641 A    7/2011

* cited by examiner

*Primary Examiner* — Mary Ellen Bowman
(74) *Attorney, Agent, or Firm* — WPAT, PC; Justin King (57) ABSTRACT

A display apparatus includes a panel module and a backlight module. The backlight module is disposed under the panel module. The backlight module includes a frame, a light guide plate, and a reflector. The frame supports the edge of the light guide plate. The reflector is disposed at the bottom of the light guide plate. The edge of the reflector and that of the frame horizontally form an engaging seam without overlapping, and the engaging seam is substantially in a serrated shape.

17 Claims, 5 Drawing Sheets

DISPLAY APPARATUS

RELATED APPLICATIONS

This application claims priority to Taiwan Application Serial Number 100139393, filed Oct. 28, 2011, which is herein incorporated by reference.

BACKGROUND

1. Field of Invention

The present invention relates to a display apparatus.

2. Description of Related Art

In recent years, owing to the rapid development of the electronics and information industries, products developed by these industries are becoming increasingly sophisticated. For current personal computers, in addition to efforts to realize faster and more powerful computing units and to offer a wide range of peripheral equipment to meet user needs, a key area of development in the computer industry relates to realizing a more compact size, lighter weight, and thinner profile for personal computers.

Liquid crystal displays have the advantages of high definition, small size, lightweight, low driving voltage, and low power consumption. Moreover, liquid crystal displays can be used in a wide range of applications, such as in portable televisions, mobile phones, camcorders, notebook computers, desktop monitors, and other consumer electronics products, and as a result, have become the most commonly used display configuration.

With the continued advancement in various technologies, liquid crystal displays are expected to become even thinner. To satisfy such a requirement, the inner components of liquid crystal displays are manufactured as thin as possible. For instance, a thin glass substrate of a width of less than 0.5 mm may be used to manufacture a liquid crystal display.

However, the foregoing approach not only easily results in bending of the substrates of the liquid crystal displays, but also results in difficulties related to transporting the liquid crystal displays, so as to reduce the yield rate of manufacture. Furthermore, when the liquid crystal displays utilizing such substrates are inadvertently bumped, breakages, nicks and other damage to the substrates may occur. Although an approach of replacing the thin glass substrate with a thin membrane made of rubber has been considered, limitations such as the temperature of manufacturing the thin membrane make this approach impractical.

A manufacturing method has been proposed in which the thickness of a liquid crystal display is reduced by etching one of the substrates therein. According to this manufacturing method, the thickness of one of the substrates is etched to about 0.1-0.2 mm, and the thickness of another one of the substrates is maintained at about 0.3-1.1 mm. Through such a configuration, a sufficient strength for the liquid crystal display is ensured. However, liquid crystal displays manufactured by such a manufacturing method are still not sufficiently thin and lightweight. Moreover, such a method increases the overall cost of manufacture.

Therefore, many in the industry are endeavoring to develop techniques that enable the thinning of display apparatuses without reducing the structural strength thereof.

SUMMARY

In order to solve the problems of the prior art, the invention provides an improved display apparatus. A frame and a reflector of a backlight module of the display apparatus are designed to be at the same level, so that the whole thickness of the display apparatus can be decreased through a reduction in the thickness of the reflector. In addition, in order to support a light guide plate of the backlight module, support from the frame is necessary under the light guide plate. Therefore, the frame of the invention is designed to partially extend toward the light guide plate, so as to achieve the function of supporting the light guide plate. Furthermore, the invention extends the reflector to a front-lower location relative to light-emitting surfaces of light sources of the backlight module, so that the backlight module provides a sufficient brightness to meet requirements. That is, the reflector of the invention has light-reflecting portions that are partially extended to the light sources, so that the reflector provides a design for improving light utilization rate. Moreover, the invention also designs the edge of the frame and the edge of reflector that are engaged to each other in a manner such that these edges are not straight. Through such a configuration of the frame and the reflector, not only is the engaging strength between the frame and the reflector enhanced, but also, downward drooping of the reflector does not easily occur.

According to an embodiment of the invention, a display apparatus includes a panel module and a backlight module. The backlight module is disposed under the panel module. The backlight module includes a frame, a light guide plate, and a reflector. The frame supports the edge of the light guide plate. The reflector is disposed at the bottom of the light guide plate. The edge of the reflector and the edge of the frame horizontally form an engaging seam without overlapping, and the engaging seam is substantially in a serrated shape.

In an embodiment of the invention, the frame further includes a plurality of first extending portions extended toward the reflector for supporting the edge of the light guide plate and horizontally engaging the reflector without overlapping.

In an embodiment of the invention, the reflector further includes a plurality of second extending portions extended toward the frame, and the second extending portions and the first extending portions horizontally form an engaging seam without overlapping.

In an embodiment of the invention, the display apparatus further includes a plurality of light sources. Each of the light sources is disposed on the frame, substantially faces the corresponding second extending portion, and is not located between two adjacent first extending portions.

In an embodiment of the invention, each of the light sources has a light-emitting surface, and each of the light-emitting surfaces is located on the corresponding second extending portion and abuts against the light guide plate.

In an embodiment of the invention, the horizontal width of each of the second extending portions is larger than the horizontal width of the corresponding light-emitting surface, and the horizontal width of each of the second extending portions is gradually expanded in a direction away from the corresponding light-emitting surface.

In an embodiment of the invention, each of the first extending portions and each of the second extending portions are substantially trapezoidal.

In an embodiment of the invention, each of the light sources has a light-emitting surface, and each of the light-emitting surfaces is exactly aligned to the edge of the corresponding second extending portion and abuts against the light guide plate.

In an embodiment of the invention, each of the first extending portions is engaged between two adjacent second extending portions, or each of the second extending portions is engaged between two adjacent first extending portions.

In an embodiment of the invention, each of the first extending portions to and each of the second extending portions are substantially rectangular.

In an embodiment of the invention, the first extending portions and the second extending portions form an engaging zone. The engaging zone includes the engaging seam. The frame and the reflector substantially have the same thickness in the engaging zone.

In an embodiment of the invention, the surface of the frame and the surface of the reflector that contact the bottom of the light guide plate are substantially coplanar.

In an embodiment of the invention, the display apparatus further includes a bezel and a tape. The bezel is assembled to the inner wall of the frame. The edge of the panel module is supported on the bezel. The panel module is located over the backlight module. The tape is adhered to the external surface of the frame and the external surface of the reflector and extends to the edge of the panel module along the sidewall of the frame.

In an embodiment of the invention, the display apparatus further includes a tape for adhering to the external surface of the frame and the external surface of the reflector.

In an embodiment of the invention, the first extending portions and the second extending portions form an engaging zone. The engaging zone includes the engaging seam, and the tape is extended to adhere to the engaging zone.

The invention further provides an improved backlight module.

According to an embodiment of the invention, a backlight module to includes a frame, a reflector, and a light guide plate. The frame has a first joint edge. The contour of the first joint edge is formed to have a plurality of slopes or curvatures. The reflector has a second joint edge. The second joint edge and the first joint edge are complementary and horizontally engaged to each other without overlapping. The light guide plate is disposed on the reflector. A portion of the frame that is adjacent to the first joint edge supports the edge of the reflector.

According to another embodiment of the invention, a backlight module includes a reflector, a frame, and a light guide plate. The edge of the frame has a plurality of protruding structures. The edge of the reflector is horizontally engaged between any two adjacent protruding structures without overlapping. The light guide plate is disposed on the reflector and supported by the protruding structures.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

An improved display apparatus is provided. Specifically, a frame and a reflector of a backlight module of the display apparatus are designed to be at the same level, so that the whole thickness of the display apparatus can be decreased through a reduction in the thickness of the reflector. In addition, in order to support a light guide plate of the backlight module, support from the frame is necessary under the light guide plate. Therefore, the frame of the invention is designed to partially extend toward the light guide plate, so as to achieve the function of supporting the light guide plate. Furthermore, the invention extends the reflector to a front-lower location relative to light-emitting surfaces of light sources of the backlight module, so that the backlight module provides a sufficient brightness to meet requirements. That is, the reflector of the invention has light-reflecting portions that are partially extended to the light sources, so that the reflector provides a design for improving light utilization rate. Moreover, the invention also designs the edge of the frame and the edge of reflector that are engaged to each other in a manner such that these edges are not straight. Through such a configuration of the frame and the reflector, not only is the engaging strength between the frame and the reflector enhanced, but also, downward drooping of the reflector does not easily occur.

Figure 1A:
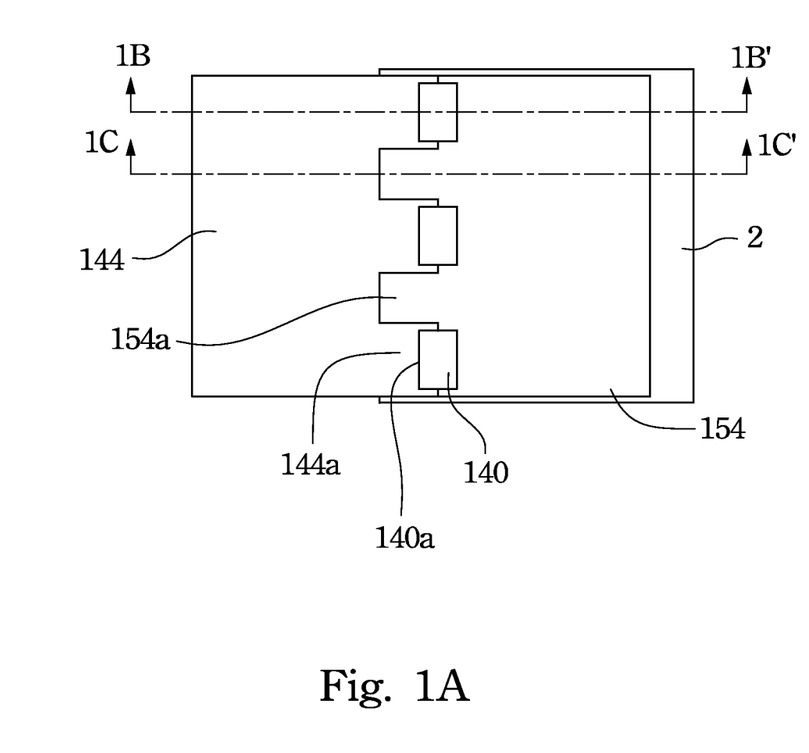
FIG. 1A is a partial top view of some components of a display apparatus according to an embodiment of the invention.
Figure 1B:
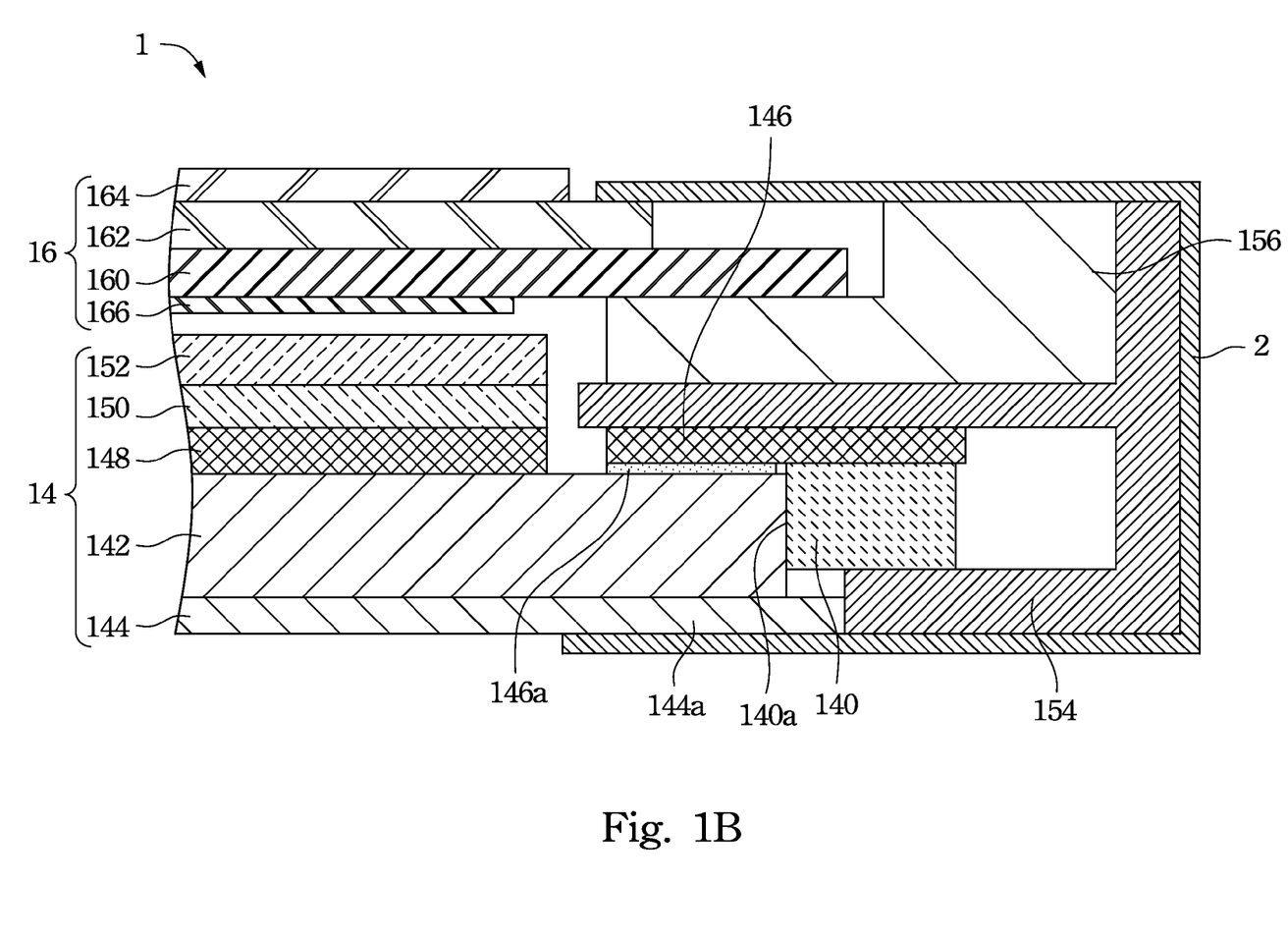
FIG. 1B is a sectional view of the display apparatus in FIG. 1A along line 1B-1B' according to an embodiment of the invention.
Figure 1C:
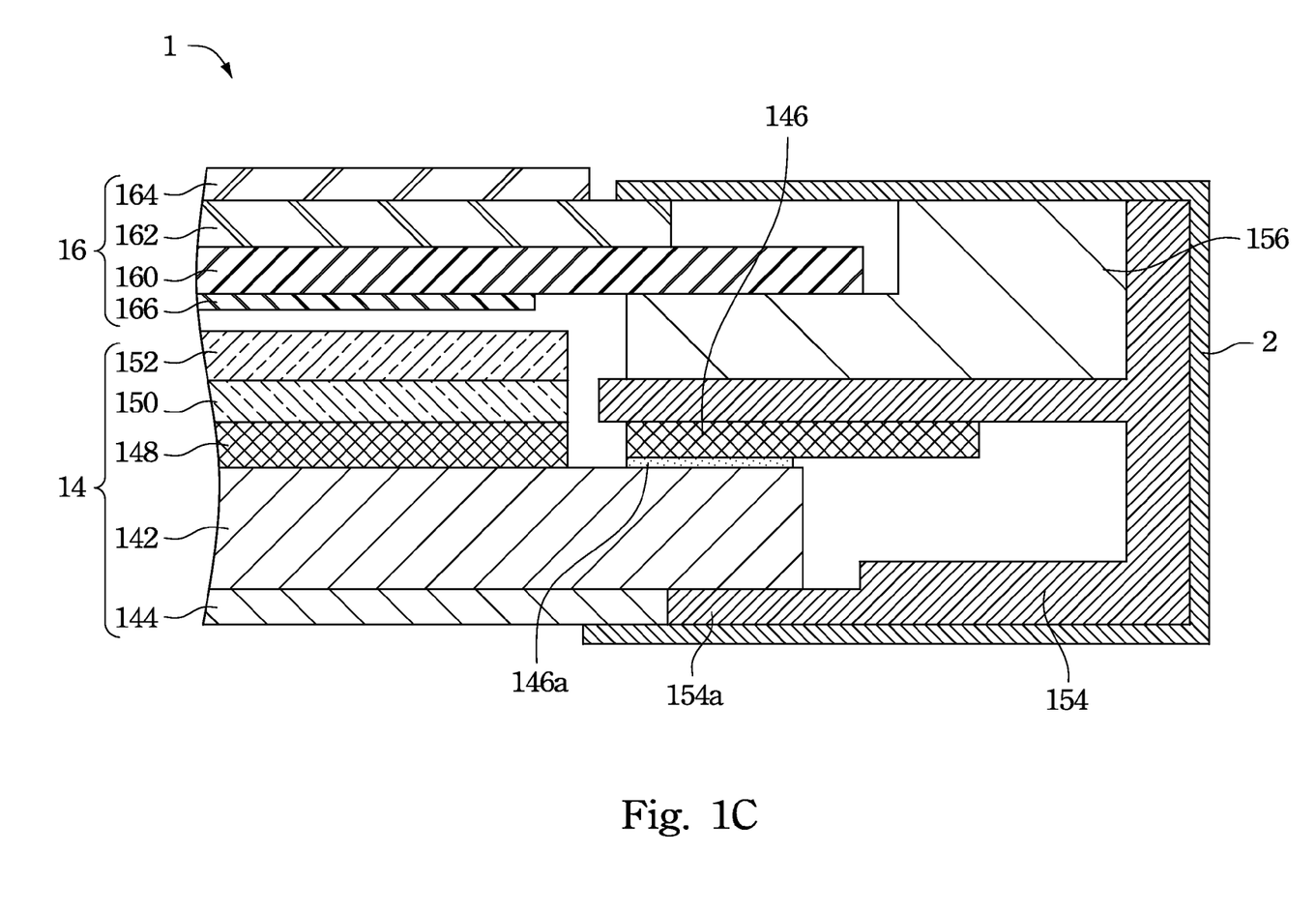
FIG. 1C is a sectional view of the display apparatus in FIG. 1A along line 1C-1C' according to an embodiment of the invention.

FIG. 1A is a partial top view of some components of a display apparatus 1 according to an embodiment of the invention. FIG. 1B is a sectional view of the display apparatus 1 in FIG. 1A along line 1B-1B' according to an embodiment of the invention. FIG. 1C is a sectional view of the display apparatus 1 in FIG. 1A along line 1C-1C' according to an embodiment of the invention.

The electronic apparatus that applies the display apparatus 1 of the invention shown in FIGS. 1A, 1B, and 1C can be a portable computer device (e.g., a notebook computer, a tablet computer, etc.) or a portable electronic product (e.g., a PDA, a mobile phone, a game console, etc.), but the invention is not limited in this regard. That is, the electronic apparatus that applies the display apparatus 1 of the invention can be any electronic product that has a to display function. As long as there is a requirement to reduce the thickness of the display apparatus 1, the concepts of the invention can be applied to design the display apparatus 1.

As shown in FIG. 1A, FIG. 1B, and FIG. 1C, the display apparatus 1 of the invention includes a backlight module 14 and a panel module 16. The backlight module 14 of the display apparatus 1 includes light sources 140, a light guide plate 142, a reflector 144, a circuit board 146, a diffusing film 148, a prism layer 150, optical films 152, a frame 154, and a bezel 156. The bezel 156 of the backlight module 14 is assembled to the inner wall of the frame 154 with the periphery thereof. The edge of the bezel 156 of the backlight module 14 is supported on the frame 154, and the frame 154 surrounds the panel module 16. The light guide plate 142 of the backlight module 14 is disposed on the reflector 144, and the frame 154 supports the edge of the light guide plate 142. The edge of the reflector 144 and the edge of the frame 154 of the backlight module 14 are horizontally engaged to each other without overlapping. The light sources 140 of the backlight module 14 are disposed on the frame 154 adjacent to a side of the reflector 144.

In the embodiment, the light sources 140 of the backlight module 14 are LEDs (Light-Emitting Diodes), but the invention is not limited in this regard. The circuit board 146 of the backlight module 14 is electrically connected to the light sources 140 and is adhered to the light guide plate 142 by an adhesive 146a. In an embodiment, the circuit board 146 of the backlight module 14 is a flexible circuit board, but the invention is not limited in this regard. The diffusing film 148, the prism layer 150, and the optical films 152 are sequentially disposed on the light guide plate 142. The bezel 156 supports the edge of the panel module 16 of the display apparatus 1.

The panel module 16 of the display apparatus 1 includes a thin-film transistor substrate 160, a color filter substrate 162, an upper polarizer 164, and a lower polarizer 166. The thin-film transistor substrate 160 and the color filter substrate 162 of the panel module 16 are adhered to each other. The upper polarizer 164 of the panel module 16 is adhered on the color filter substrate 162. The lower polarizer 166 of the panel module 16 is adhered on the thin-film transistor substrate 160.

With this configuration, the light sources 140 of the backlight module 14 are able to emit light into the light guide plate 142, and the light is reflected by the reflector 144 to subsequently pass through the diffusing film 148, the prism layer 150, the optical films 152, the lower polarizer 166, the thin-film transistor substrate 160, the color filter substrate 162, and the upper polarizer 164 and then leave the panel module 16, so that the light is visible to users.

Figure 2A:
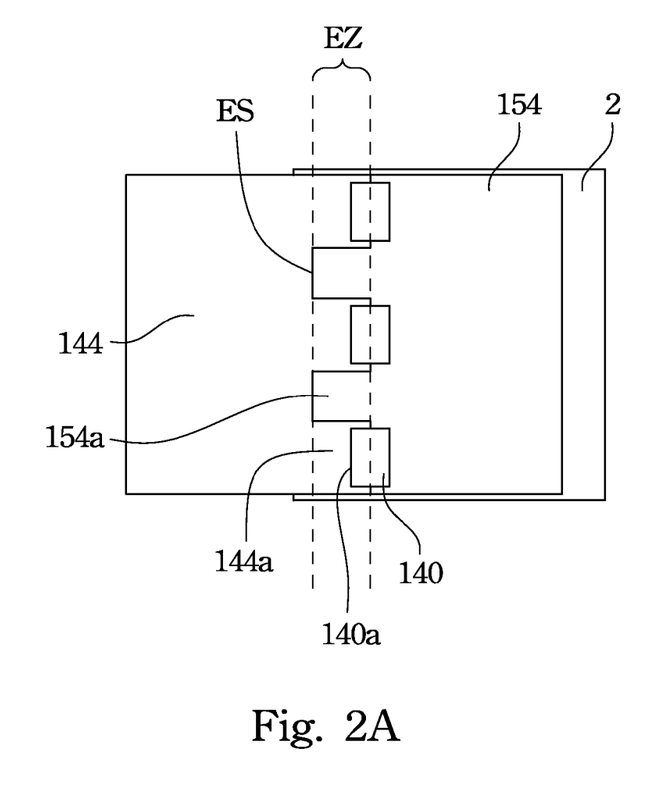
FIG. 2A is a partial top view of components of a display apparatus in FIG. 1A according to an embodiment of the invention, in which an engaging zone is illustrated by dotted lines.

FIG. 2A is a partial top view of components of a display apparatus 1 in FIG. 1A according to an embodiment of the invention, in which an engaging zone EZ is illustrated by dotted lines.

As shown in FIG. 1B, FIG. 1C, and FIG. 2A, the frame 154 of the backlight module 14 further includes a plurality of first extending portions 154a. The first extending portions 154a that are located at a first joint edge of the frame 154 (i.e., the edge of the frame 154 that is connected to the reflector 144) are extended toward the reflector 144 (i.e., a plurality of protruding structures are formed at the first joint edge of the frame 154) for supporting the edge of the light guide plate 142 and horizontally engaging the reflector 144 without overlapping. Therefore, the first extending portions 154a of the frame 154 can extend toward the bottom of the light guide plate 142 to support the light guide plate 142, and any two adjacent first extending portions 154a horizontally engage the edge of the reflector 144 without overlapping. With this configuration, not only can the engaging strength between the frame 154 and the reflector 144 be enhanced, but also, downward drooping of the reflector 144 does not easily occur.

With continued reference to FIG. 1B, FIG. 1C, and FIG. 2A, each of the light sources 140 of the backlight module 14 has a light-emitting surface 140a, and each of the light-emitting surfaces 140a abuts against the light guide plate 142, so that the light generated by the light sources 140 is directly emitted into the light guide plate 142. Because the light sources 140 of the backlight module 14 are disposed on the frame 154, the brightness of the backlight module 14 may be decreased by about 10% (according to the reflectivity of the frame 154) if the frame 154 rather than the reflector 144 is at the front-lower location relative to the light-emitting surfaces 140a of the light sources 140, which may reduce the light utilization rate. In view of this, the reflector 144 of the backlight module 14 further includes a plurality of second extending portions 144a. Each of the second extending portions 144a that is located at a second joint edge (i.e., the edge of the reflector 144 that is connected to the frame 154) of the reflector 144 is extended toward the front-lower location relative to the corresponding light-emitting surface 140a (i.e., a plurality of protruding structures are formed at the second joint edge of the reflector 144), so that the second extending portions 144a and the first extending portions 154a of the frame 154 horizontally form an engaging seam ES without overlapping. Each of the light sources 140 of the backlight module 14 substantially faces the corresponding second extending portion 144a on the reflector 144 and is not located between two adjacent first extending portions 154a.

In an embodiment, owing to inaccuracies occurring during manufacture and/or assembly but which are within manufacturing and assembly tolerances, the light-emitting surface 140a of each of the light sources 140 may not exactly abut against the corresponding second extending portion 144a. Therefore, the light-emitting surface 140a of each of the light sources 140 is slightly moved toward the reflector 144 (the amount of movement is larger than the tolerances), so as to make the light-emitting surface 140a of each of the light sources 140 be located over the corresponding second extending portion 144a (i.e., each of the light sources 140 is located over the interface between the second extending portions 144a of the reflector 144 and the frame 154) and abut against the light guide plate 142, as shown in FIG. 2A. Therefore, even if there are manufacturing and/or assembly inaccuracies, the light-emitting surface 140a of each of the light sources 140 that is located over the corresponding second extending portion 144a of the reflector 144 is positioned to ensure that the light emitted by all the light sources 140 can be completely reflected by the reflector 144.

As shown in FIG. 2A, each of the first extending portions 154a of the frame 154 is engaged between two adjacent second extending portions 144a of the reflector 144, or each of the second extending portions 144a of the reflector 144 is engaged between two adjacent first extending portions 154a of the frame 154, so as to achieve the purpose of horizontally engaging the frame 154 and the reflector 144 without overlapping. Hence, in the horizontal direction, the first extending portions 154a are alternatingly disposed with the second extending portions 144a. However, the invention is not limited in this regard. In another embodiment, some of the first extending portions 154a of the frame 154 are engaged between two adjacent second extending portions 144a of the reflector 144, or some of the second extending portions 144a of the reflector 144 are engaged between two adjacent first extending portions 154a of the frame 154.

In an embodiment, each of the first extending portions 154a of the frame 154 and each of the second extending portions 144a of the reflector 144 are substantially rectangular, but the invention is not limited in this regard. Each of the first extending portions 154a of the frame 154 and each of the second extending portions 144a of the reflector 144 can also be arc-shaped, triangular, a shape formed by lines with different slopes, etc., as long as the shape allows for complete or partial engagement between the first extending portions 154a of the frame 154 and the second extending portions 144 of the reflector 144.

Figure 2B:
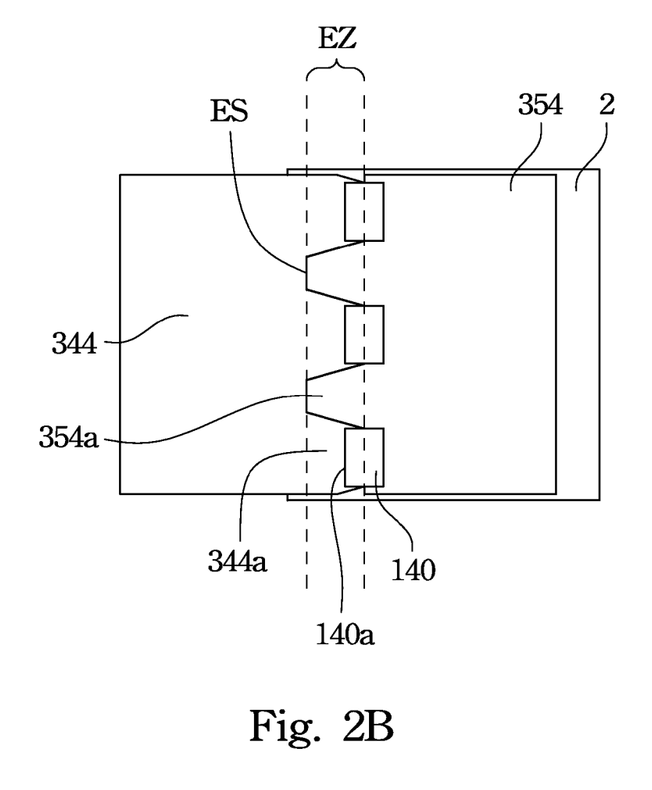
FIG. 2B is a partial top view of components of a display apparatus in FIG. 1A according to another embodiment of the invention, in which an engaging zone is illustrated by dotted lines.

FIG. 2B is a partial top view of components of a display apparatus 1 in FIG. 1A according to another embodiment of the invention, in which an engaging zone EZ is illustrated by dotted lines.

As shown in FIG. 2B, because the light sources 140 are realized using light-emitting diodes, the light emitted by the light sources 140 has a certain diverging angle. In order to prevent the light emitted by the light sources 140 from being reflected by the frame 354 rather than the reflector 344, the horizontal width of each of the second extending portions 344a can be larger than the horizontal width of the light-emitting surface 140a of the corresponding to light source 140.

Furthermore, in order to correspond to the diverging angle of the light emitted by the light sources 140, the horizontal widths of each of the second extending portions 344a of the reflector 344 can be gradually expanded in a direction away from the light-emitting surface 140a of the corresponding light source 140. In an embodiment, each of the first extending portions 354a of the frame 354 and each of the second extending portions 344a of the reflector 344 are substantially trapezoidal, but the invention is not limited in this regard.

Figure 3A:
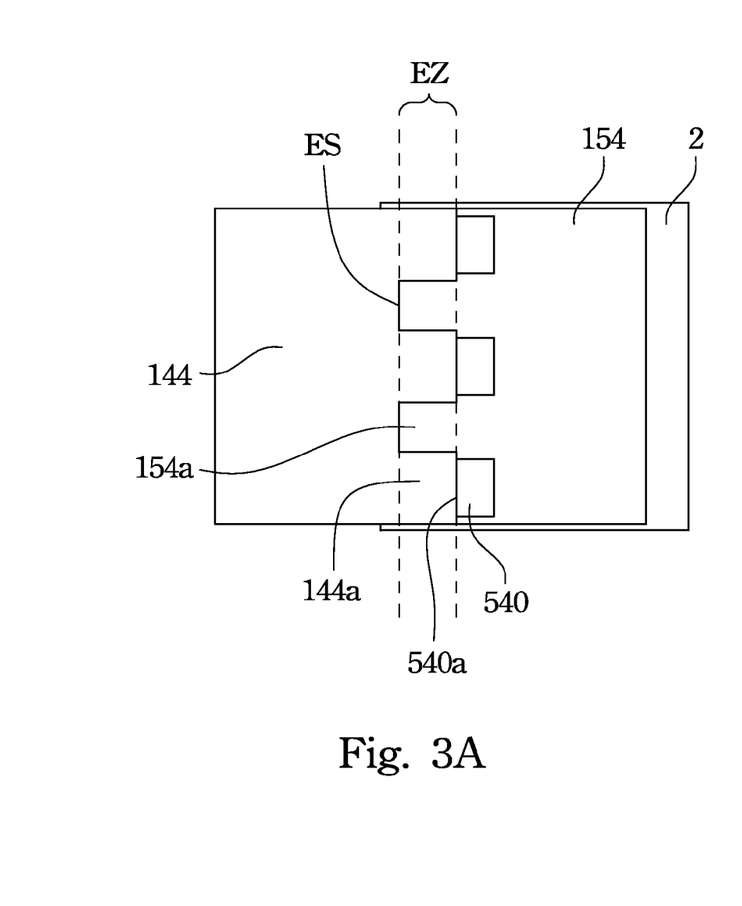
FIG. 3A is a partial top view of components of a display apparatus in FIG. 2A according to another embodiment of the invention, in which an engaging zone is illustrated by dotted lines.
Figure 3B:
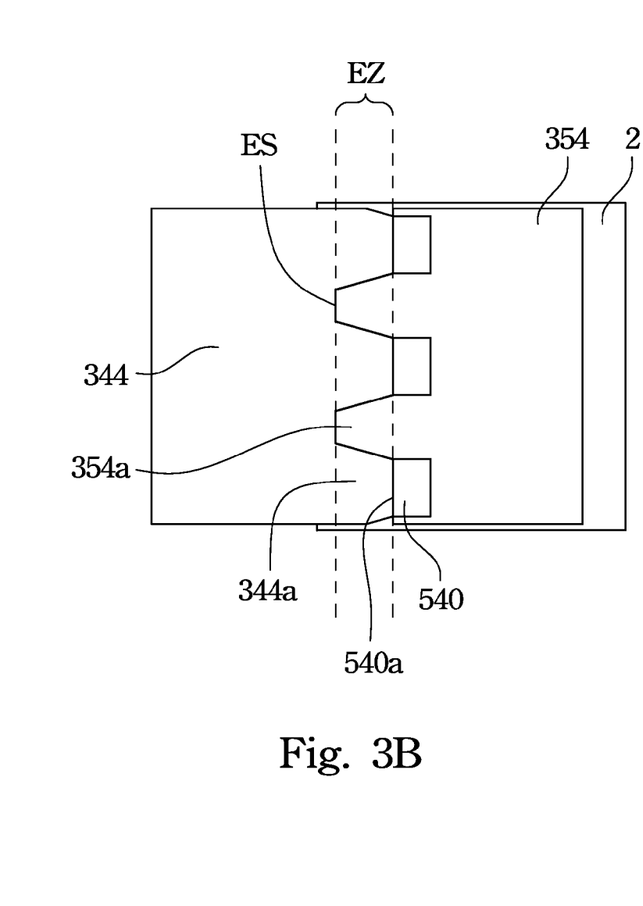
FIG. 3B is a partial top view of components of a display apparatus in FIG. 2B according to another embodiment of the invention, in which an engaging zone is illustrated by dotted lines.

FIG. 3A is a partial top view of components of a display apparatus 1 in FIG. 2A according to another embodiment of the invention, in which an engaging zone EZ is illustrated by dotted lines. FIG. 3B is a partial top view of components of a display apparatus 1 in FIG. 2B according to another embodiment of the invention, in which an engaging zone EZ is illustrated by dotted lines.

As shown in FIG. 3A, if the problem of inaccuracies within set tolerances can be eliminated through progress in assembling and manufacturing accuracy, each of the light-emitting surfaces 540a of the light sources 540 can be exactly aligned to the edge of the corresponding second extending portion 144a (i.e., each of the light-emitting surfaces 540a of the light sources 540 is exactly located over the interface between the second extending portions 144a of the reflector 144 and the frame 154). Therefore, the light emitted out of the light-emitting surfaces 540a of the light sources 540 of the backlight module 14 can be completely reflected by the second extending portions 144a of the reflector 144, so that the light utilization rate can be improved.

Similarly, if the problem of inaccuracies within set tolerances can be eliminated through progress in assembling and manufacturing accuracy, each of the light-emitting surfaces 540a of the light sources 540 in FIG. 3B can be exactly aligned to the edge of the corresponding second extending portion 344a (i.e., each of the light-emitting surfaces 540a of the light sources 540 is exactly located over the interface between the second extending portions 344a of the reflector 344 and the frame 354). Therefore, the light emitted out of the light-emitting surfaces 540a of the light sources 540 of the backlight module 14 can be completely reflected by the second extending portions 344a of the reflector 344, so that the light utilization rate can be improved.

As shown in FIG. 1B, FIG. 1C, and FIG. 2A, the first extending portions 154a of the frame 154 and the second extending portions 144a of the reflector 144 form the engaging zone EZ. The engaging zone EZ includes the engaging seam ES between the first extending portions 154a and the second extending portions 144a, and the frame 154 and the reflector 144 substantially have the same thickness in the engaging zone EZ. Furthermore, the surface of the frame 154 and the surface of the reflector 144 that contact the bottom of the light guide plate 142 are substantially coplanar. That is, the invention designs the frame 154 and the reflector 144 to be at the same level, so the whole thickness of the display apparatus 1 can be thinned because the thickness of the reflector 144 is reduced.

As shown in FIG. 1B, FIG. 1C, and FIG. 2A, the display apparatus 1 of the invention further includes a tape 2. The tape 2 is adhered to the external surface of the frame 154 and the external surface of the reflector 144 and extends to the edge of the panel module 16 along the sidewall of the frame 154. In addition, an adhesive area of the tape 2 is able to cover the engaging zone EZ formed by the first extending portions 154a and the second extending portions 144a. By adhering the tape 2 to the engaging zone EZ formed by the first extending portions 154a and the second extending portions 144a, the engaging strength between the frame 154 and the reflector 144 can be further improved. Correspondingly, the supporting capability of the tape 2 can be improved without drooping down after being adhered to the engaging seam ES that is formed by lines with different slopes or different radiuses (e.g., jagged, rack-shaped, wavy, etc.).

According to the foregoing recitations of the embodiments of the invention, it can be seen that the frame and the reflector of a backlight module of the display apparatus are designed to be at the same level, so that the whole thickness of the display apparatus can be decreased through a reduction in the thickness of the reflector. In addition, in order to support the light guide plate of the backlight module, support from the frame is necessary under the light guide plate. Therefore, the frame of the invention is designed to partially extend toward the light guide plate, so as to achieve the function of supporting the light guide plate. Furthermore, the invention extends the reflector to a front-lower location relative to the light-emitting surfaces of the light sources of the backlight module, so that the backlight module provides a sufficient brightness to meet requirements. That is, the reflector of the invention has light-reflecting portions that are partially extended to the light sources, so that the reflector provides a design for improving light utilization rate. Moreover, the invention also designs the edge of the frame and the edge of reflector that are engaged to each other in a manner such that these edges are not straight. Through such a configuration of the frame and the reflector, not only is the to engaging strength between the frame and the reflector enhanced, but also, downward drooping of the reflector does not easily occur.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A display apparatus comprising:
 a panel module; and
 a backlight module disposed under the panel module, the backlight module comprising:
  a light guide plate;
  a frame which supports the edge of the light guide plate; and
  a reflector disposed at the bottom of the light guide plate, wherein the edge of the reflector and the edge of the frame horizontally form an engaging seam without overlapping, and the engaging seam is substantially in a serrated shape.

2. The display apparatus of claim 1, wherein the frame further comprises a plurality of first extending portions extended toward the reflector for supporting the edge of the light guide plate and horizontally engaging the reflector without overlapping.

3. The display apparatus of claim 2, wherein the reflector further comprises a plurality of second extending portions extended toward the frame, and the second extending portions and the first extending portions horizontally form an engaging seam without overlapping.

4. The display apparatus of claim 3, further comprising a plurality of light sources, each of the light sources being disposed on the frame, substantially facing the corresponding second extending portion, and not being located between two adjacent first extending portions.

5. The display apparatus of claim 4, wherein each of the light sources has a light-emitting surface, and each of the light-emitting surfaces is located on the corresponding second extending portion and abuts against the light guide plate.

6. The display apparatus of claim 5, wherein the horizontal width of each of the second extending portions is larger than the horizontal width of the corresponding light-emitting surface, and the horizontal width of each of the second extending portions is gradually expanded in a direction away from the corresponding light-emitting surface.

7. The display apparatus of claim 6, wherein each of the first extending portions and each of the second extending portions are substantially trapezoidal.

8. The display apparatus of claim 4, wherein each of the light sources has a light-emitting surface, and each of the light-emitting surfaces is exactly aligned to the edge of the corresponding second extending portion and abuts against the light guide plate.

9. The display apparatus of claim 3, wherein each of the first extending portions is engaged between two adjacent second extending portions, or each of the second extending portions is engaged between two adjacent first extending portions.

10. The display apparatus of claim 9, wherein each of the first extending portions and each of the second extending portions are substantially rectangular.

11. The display apparatus of claim 9, wherein the first extending portions and the second extending portions form an engaging zone, the engaging zone comprises the engaging seam, and the frame and the reflector substantially have the same thickness in the engaging zone.

12. The display apparatus of claim 1, wherein the surface of the frame and the surface of the reflector that contact the bottom of the light guide plate are substantially coplanar.

13. The display apparatus of claim 1, further comprising:
a bezel assembled to the inner wall of the frame, wherein the edge of the panel module is supported on the bezel, and the panel module is located over the backlight module; and
a tape adhered to the external surface of the frame and the external surface of the reflector and extends to the edge of the panel module along the sidewall of the frame.

14. The display apparatus of claim 1, further comprising a tape for adhering to the external surface of the frame and the external surface of the reflector.

15. The display apparatus of claim 14, wherein the first extending portions and the second extending portions form an engaging zone, the engaging zone comprises the engaging seam, and the tape is extended to adhere to the engaging zone.

16. A backlight module comprising:
a frame having a first joint edge, wherein the contour of the first joint edge is formed to have a plurality of slopes or curvatures;
a reflector having a second joint edge, wherein the second joint edge and the first joint edge are complementary and horizontally engaged to each other without overlapping; and
a light guide plate disposed on the reflector, wherein the edge of the reflector is supported by a portion of the frame that is adjacent to the first joint edge.

17. A backlight module comprising:
a reflector;
a frame, the edge of which has a plurality of protruding structures, wherein the edge of the reflector is horizontally engaged between any two adjacent protruding structures without overlapping; and
a light guide plate disposed on the reflector and supported by the protruding structures.

* * * * *